(12) United States Patent
Meyer et al.

(10) Patent No.: US 11,080,413 B2
(45) Date of Patent: Aug. 3, 2021

(54) METHODS AND SYSTEMS FOR CREATING, VERIFYING, AND ENTERING SECURITY INFORMATION

(71) Applicant: INTEGRITY Security Services LLC, Santa Barbara, CA (US)

(72) Inventors: Alan T. Meyer, Anaheim Hills, CA (US); Cameron Durham, Santa Barbara, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 17/077,308

(22) Filed: Oct. 22, 2020

(65) Prior Publication Data

US 2021/0124831 A1 Apr. 29, 2021

Related U.S. Application Data

(60) Provisional application No. 62/925,985, filed on Oct. 25, 2019.

(51) Int. Cl.
*G06F 21/62* (2013.01)
*G06F 21/60* (2013.01)
*G06F 3/12* (2006.01)

(52) U.S. Cl.
CPC .......... *G06F 21/608* (2013.01); *G06F 3/1238* (2013.01); *G06F 3/1274* (2013.01); *G06F 21/62* (2013.01)

(58) Field of Classification Search
CPC ...... G06F 21/608; G06F 21/62; G06F 3/1238; G06F 3/1274
USPC ................ 358/1.9, 1.11, 1.18; 726/26, 35, 2
See application file for complete search history.

(56) References Cited

U.S. PATENT DOCUMENTS

| | | | |
|---|---|---|---|
| 7,325,052 B1 * | 1/2008 | Motoyama | G06F 21/554 709/223 |
| 2007/0050696 A1 | 3/2007 | Piersol et al. | |
| 2009/0009802 A1 * | 1/2009 | Shaw | G06F 3/1222 358/1.15 |

(Continued)

OTHER PUBLICATIONS

Lee W. Young (Authorized Officer), International Search Report and Written Opinion dated Jan. 25, 2021, in corresponding PCT Application No. PCT/US2020/056793, 13 pages.

*Primary Examiner* — Jamares Q Washington
(74) *Attorney, Agent, or Firm* — MH2 Technology Law Group LLP

(57) ABSTRACT

A system for securely producing and using high-entropy security information, such as a password. The system includes a printer, a display device, and a generator computer that is connected to the printer and the display device. The generator computer generates the high-entropy set of characters, (e.g., password), and also generates a machine-readable representation of the high-entropy set of characters, (e.g., a barcode). The generator computer causes the printer to print the high-entropy set of characters and the machine-readable representation on paper, and then deletes the high-entropy set of characters and the machine-readable representation from the system. The high-entropy set of characters, (e.g., password), may be entered into a target computer by scanning the barcode on the paper using a barcode scanner connected to the target computer, which is significantly faster than, and eliminates the human error associated with, typing in a high-entropy set of characters.

30 Claims, 8 Drawing Sheets

(56) References Cited

U.S. PATENT DOCUMENTS

| | | | |
|---|---|---|---|
| 2012/0131354 A1* | 5/2012 | French | H04L 9/3271 |
| | | | 713/189 |
| 2013/0167228 A1* | 6/2013 | Wong | G06F 21/62 |
| | | | 726/19 |
| 2013/0254856 A1* | 9/2013 | Krishan | H04L 63/083 |
| | | | 726/6 |
| 2014/0289870 A1* | 9/2014 | Selander | G06F 21/46 |
| | | | 726/28 |
| 2015/0358163 A1* | 12/2015 | Carter | G09C 5/00 |
| | | | 713/179 |

* cited by examiner

ISS Password Form

Key Check Value: 86a739

```
    00 01 02 03 04 05 06 07 08 09 10 11 12 13 14 15 16 17 18 19
     H  v  )  Z  D  f  g  Q  f  %  )  R  1  F  3  [  T  >  z  D

00: H HOTEL      01: v victor      02: ) close paren   03: z zulu
    04: D DELTA      05: f foxtrot     06: g golf          07: Q QUEBEC
    08: T TANGO      09: % percentage  10: } close brace   11: R ROMEO
    12: 1 one        13: F FOXTROT     14: 3 three         15: [ open bracket
    16: T TANGO      17: < less than   18: z zulu          19: D DELTA
```

Key Check Value: 86a739

ISS PIN Form

Key Check Value: cf40b6

| d | z | 0 | b | 4 | r | ~ | g |
|---|---|---|---|---|---|---|---|
| 00 | 01 | 02 | 03 | 04 | 05 | 06 | 07 |

00: d delta        01: z ZULU       02: 0 zero       03: b bravo
04: 4 four         05: r romeo      06: ~ tilde      07: g golf Key Check Value: cf40b6

ISS Key Component Form

Key Check Value: 58c3a6

| 0 | 0 | 1 | 2 | 1 | b | 5 | 7 | 6 | c | d | 2 | 1 | 5 | 5 | c |
|---|---|---|---|---|---|---|---|---|---|---|---|---|---|---|---|
| 00 | 01 | 02 | 03 | 04 | 05 | 06 | 07 | 08 | 09 | 10 | 11 | 12 | 13 | 14 | 15 |
| 1 | e | e | 3 | e | 8 | 8 | 1 | 9 | 2 | 5 | 4 | 9 | 6 | 0 | 7 |
| 16 | 17 | 18 | 19 | 20 | 21 | 22 | 23 | 24 | 25 | 26 | 27 | 28 | 29 | 30 | 31 |
| 4 | d | b | 0 | b | b | b | 1 | 7 | 4 | c | a | d | 5 | d | e |
| 32 | 33 | 34 | 35 | 36 | 37 | 38 | 39 | 40 | 41 | 42 | 43 | 44 | 45 | 46 | 47 |
| 7 | 3 | a | a | 3 | 5 | e | e | 1 | 3 | c | a | 4 | 9 | 5 | 3 |
| 48 | 49 | 50 | 51 | 52 | 53 | 54 | 55 | 56 | 57 | 58 | 59 | 60 | 61 | 62 | 63 |

} 130

```
00: 6  six       01: 0  zero      02: 1  one       03: 2  two
04: 1  one       05: b  bravo     06: 5  five      07: 7  seven
08: 6  six       09: c  charlie   10: d  delta     11: 2  two
12: 1  one       13: 5  five      14: 5  five      15: c  charlie
16: 1  one       17: e  echo      18: e  echo      19: 3  three
20: e  echo      21: 8  eight     22: 8  eight     23: 1  one
24: g  nine      25: 2  two       26: 5  five      27: 4  four
28: g  nine      29: 6  six       30: 0  zero      31: 7  seven
32: 4  four      33: d  delta     34: b  bravo     35: 0  zero
36: b  bravo     37: b  bravo     38: b  bravo     39: 1  one
40: 7  seven    41: 4  four       42: c  charlie   43: a  alpha
44: d  delta     45: 5  five      46: d  delta     47: e  echo
48: 7  seven    49: 3  three      50: z  alpha     51: a  alpha
52: 3  three    53: 5  five       54: e  echo      55: e  echo
56: 1  one      57: 3  three      58: c  charlie   59: a  alpha
60: 4  four     61: 9  nine       62: 5  five      63: 3  three
```
} 220

Key Check Value: 58c3a6 — 210

 135

FIG. 7 125

METHODS AND SYSTEMS FOR CREATING, VERIFYING, AND ENTERING SECURITY INFORMATION

CROSS-REFERENCE TO RELATED APPLICATIONS

This application claims the benefit of and priority to U.S. Provisional Application No. 62/925,985 filed on 25 Oct. 2019, which is hereby incorporated by reference in its entirety.

FIELD OF THE INVENTION

This invention relates to the systems, devices, manufactures, and methods for creating, verifying, retaining, and reliably entering security information, such as passwords, PINs, cryptographic keys, and the like. The security information may be created or generated by a dedicated computing system and may be automatically entered into another computing device, for example, to log into a highly secure server.

BACKGROUND

Security information, such as passwords, PINs, cryptographic keys, and the like, is best and most secure when it is in the form of a high-entropy string or set of characters. For example, the best passwords use both a large number of randomly chosen characters (e.g., 12 or more) and a large, varied character set (e.g., more than just the letters of the alphabet or just numbers) from which they are chosen.

A significant drawback, however, is that the higher the entropy of a set of security information characters, e.g., a password, the more difficult it is for a user to enter it correctly into a keyboard and to remember it. Typically, conventional systems and methods address this drawback by using physical paper forms on which a user manually writes down their high-entropy password. The forms are physically securely stored, e.g., locked in a safe, until needed, e.g., to log in to a highly secure computing system. To login, the user must retrieve the physical form, read the password, and then attempt to type the password from the form into a keyboard of the secure target computer system. This procedure is very time consuming and very difficult to perform without errors, especially for users with a reading, physical, or dexterity disability; in part because high-entropy passwords are by the nature of their characteristics difficult to type and remember.

Various embodiments described herein address these and other drawbacks associated with high-entropy security information.

BRIEF SUMMARY

Disclosed are system, methods, and devices for producing, verifying, entering and or using high-entropy security information, such as a password or the like. In various embodiments, the system may comprise a printer; a display device; and a generator computer that is operably connected to the printer and the display device. The generator computer may include a processor; and a storage device that is operably connected to the processor and that contains instructions. The processor may execute the instructions to perform operations including: generating a high-entropy set of characters; generating a machine-readable representation that represents the high-entropy set of characters; providing the high-entropy set of characters and the machine-readable representation to the printer for printing on paper; and subsequently deleting the original electronic forms of the high-entropy set of characters and the machine-readable representation. In some embodiments, the electronic forms may be removed, for example, from all of the generator computer's volatile storage devices (e.g., DRAM) and non-volatile storage devices.

In some embodiments, the printer lacks a storage device. In some embodiments, deleting the high-entropy set of characters and the machine-readable representation includes directing the printer to delete the high-entropy set of characters and the machine-readable representation after the printing.

In some embodiments, the storage device is a removable storage device; generating the high-entropy set of characters includes storing the high-entropy set of characters on the removable storage device; and generating the machine-readable representation comprises storing the machine-readable representation on the removable storage device. In some such embodiments, deleting the high-entropy set of characters and the machine-readable representation further includes erasing the high-entropy set of characters and the machine-readable representation from the removable storage device. In some other such embodiments, the removable storage device is configured to render the high-entropy set of characters and the machine-readable representation unrecoverable upon detecting tampering with the removable storage device.

In various embodiments, the processor may also perform the operation of determining a number of characters for the high-entropy security information; and generating the high-entropy set of characters includes generating the high-entropy set of characters according to the number of characters.

In various embodiments, the processor may also perform the operation of: displaying the high-entropy set of characters on the display device; and enabling a user to visually confirm and/or edit the high-entropy set of characters using the display device. In some such embodiments, deleting the high-entropy set of characters and the machine-readable representation includes clearing the high-entropy set of characters from the display device.

In various embodiments, the high-entropy set of characters is input into a target computer using the machine-readable representation that was printed. In various embodiments, the high-entropy set of characters is at least one of: a password, a personal identification number (PIN), or a key that is used in cryptography. In various embodiments, the machine-readable representation is a barcode. In various embodiments, the machine-readable representation is a quick response (QR) code.

In some embodiments, the system further include a target system comprising: a target computer; and a reader device that is operably connected to the target computer and that reads the machine-readable representation from the paper and provides the high-entropy set of characters that is represented by the machine-readable representation to the target computer. In some such embodiments, the reader device is a barcode scanner, and the machine-readable representation is a barcode. In some other such embodiments, the reader device is a digital camera, and the machine-readable representation is a barcode.

In some embodiments, the operations further comprise: calculating a key check value (KCV) from the high-entropy set of characters; and providing the key check value to the printer for printing on the paper.

Another embodiment is a system for producing high-entropy security information that includes a printer; a display device; and a generator computer that is operably connected to the printer and the display device. The generator computer includes a processor; and a storage device that is operably connected to the processor and that contains instructions. The processor executes the instructions to perform operations that include: generating a high-entropy set of characters; displaying the high-entropy set of characters on the display device; accepting input from a user to edit the high-entropy set of characters; generating a machine-readable representation that represents the high-entropy set of characters; calculating a key check value from the entropy set of characters; causing the printer to print the high-entropy set of characters, the machine-readable representation, and the key check value on a paper; and deleting the high-entropy set of characters and the machine-readable representation.

In various embodiments, the operations performed by the processor further include deleting the key check value. In various embodiments, deleting the high-entropy set of characters further includes erasing the high-entropy set of characters from the display device.

In some embodiments, the operations further comprise: determining a number of characters for the high-entropy security information, and generating the high-entropy set of characters includes generating the high-entropy set of characters according to the number of characters.

In some embodiments, the storage device is a removable storage device, and deleting the high-entropy set of characters and the machine-readable representation includes deleting the high-entropy set of characters and the machine-readable representation from the removable storage device.

In some embodiments, the high-entropy set of characters is input into a target computer using the machine-readable representation printed on the paper.

In some embodiments, the machine-readable representation is a barcode.

In some embodiments, generating a high-entropy set of characters includes randomly selecting a set of characters from a keyboard character set.

In some embodiments, generating a high-entropy set of characters includes determining that the high-entropy set of characters does not contain one or more of: a word, a name, and a date.

In some embodiments, the high-entropy set of characters is input into a target computer using the machine-readable representation that was printed.

In some embodiments, the system further includes a target system comprising: a target computer; and a reader device that is operably connected to the target computer and that reads the machine-readable representation from the paper and provides the high-entropy set of characters that is represented by the machine-readable representation to the target computer. In some such embodiments, the reader device is a barcode scanner, and the machine-readable representation is a barcode. In some other such embodiments, the reader device is a digital camera, and the machine-readable representation is a barcode.

It is intended that combinations of the above-described elements and those within the specification may be made, except where otherwise contradictory.

BRIEF DESCRIPTION OF THE DRAWINGS

The accompanying drawings, which are incorporated into and constitute a part of this specification, illustrate examples and embodiments of the invention and together with the description, serve to explain the principles of the invention.

FIG. 7 is an example of a printed form that includes a 64-character key represented in characters and in a QR code, which may be generated and used by systems consistent with embodiments of the invention.

DETAILED DESCRIPTION

Figure 1A:
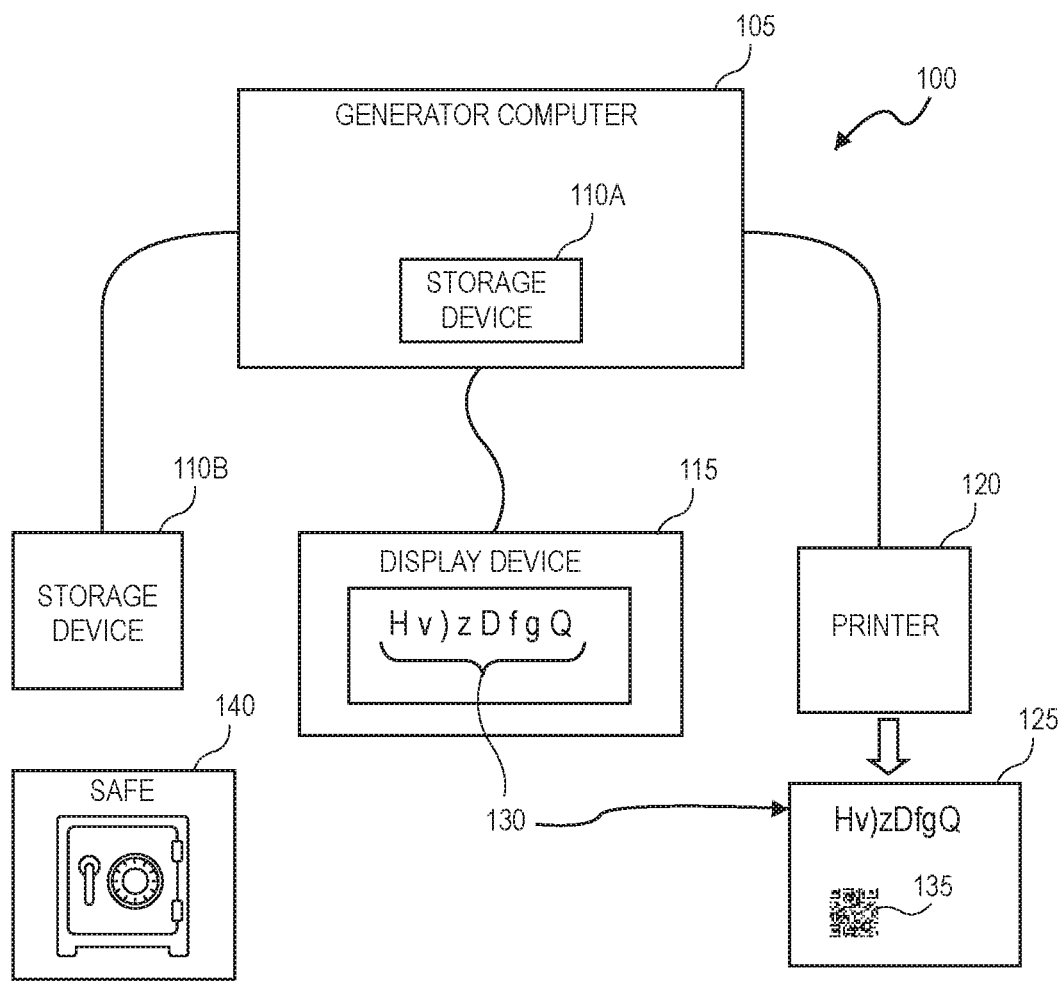
FIG. 1A is block diagram showing an example of a system for securely producing high-entropy security information, consistent with embodiments of the invention.

Reference will now be made in detail to embodiments of the invention, examples of which are illustrated in the accompanying figures.

Various embodiments and implementations consistent with the invention provide systems, components, methods, and computer program products for generating and using high-entropy security information, (for example, a high-entropy password, PIN, key, or other high-entropy set of characters) that may be entered or employed, for example, to access a target secure computing system (e.g., a computing device containing sensitive data), and that may be represented and entered in a manner that essentially eliminates input errors by the user. This is a significant technical improvement to systems that use high-entropy security information, especially systems that allow very few input errors (e.g., five or less incorrect password entry attempts), before initiating a lock out.

As used herein, high-entropy information refers to information (e.g., a set of characters) that is difficult for someone to determine, guess or solve with a brute force attack or the like. In the case of a password and other types of security information, entropy is based on the size of the character set used (i.e., the number of possible characters that can be employed, which is expansible by using lowercase, uppercase, numbers, special characters, symbols, etc.), the randomness of the characters in the password (e.g., randomly chosen characters where each character is randomly selected independent of the previous characters, and that do not intentionally or unintentionally form or include words or names or dates), and the password length—i.e., the total number of characters in the password or other security-information string of characters. For example, the longer the password (or other security information) is, the bigger the possible character set is, and the more non-random subsets are avoided, the higher the entropy of the password.

One example of high-entropy information (i.e., a high-entropy set of characters) is a set of eight or more characters (e.g., for a PIN) that are randomly chosen from a group of keyboard characters (the keyboard character set) that includes: the 26 lower case letters of the alphabet, plus the 26 upper case letters of the alphabet, plus the numbers 0-9, plus the punctuation marks (period, question mark, exclamation point, comma, semicolon, colon, dash, hyphen, open parentheses, close parentheses, open bracket, close bracket, open brace, close brace, apostrophe, open single quotation mark, close single quotation mark, open double quotation mark, and close double quotation mark), plus the special characters on a keyboard: @, #, $, %, A, &, *, +, =, |, \, <, >/, and '. Another example of high-entropy information (i.e., a high-entropy set of characters) is a set of 12 or more characters (e.g., for a password) that are randomly chosen from the keyboard character set described in the previous sentence. Another example of high-entropy information (i.e., a high-entropy set of characters) is a set of 20 or more characters that are randomly chosen from the keyboard character set described above, but minus one to three of the subgroups described, such as minus the special characters subgroup. Yet another example of high-entropy information (i.e., a high-entropy set of characters) is a set of 32 or more characters (e.g., a set of 64 characters for a crypto key) that are randomly chosen from the group of 16 hexadecimal characters or symbols (0, 1, 2, 3, 4, 5, 6, 7, 8, 9, a, b, c, d, e, f).

A significant drawback of using high-entropy security information, however, is that the higher the entropy of the set of characters that makes up the security information, (e.g., a password, a PIN, a key, etc.), the more difficult it is to enter or type correctly into a keyboard, (especially when the characters are not displayed during typing), and to remember. This can be particularly problematic for use in secure systems that lock out a user after a small number of unsuccessful attempts to enter a password, PIN, or the like (e.g., two or three failed attempts) and/or in secure systems that allow a short amount of time (e.g., 15 seconds or less) to enter a password, PIN, or the like and complete log in. These drawbacks, in turn, cause users to prefer, create, and commonly use passwords or PINs that are relatively short (e.g., less than 12 characters long), that contain non-random character strings (e.g., words, names, birthdates, etc.), that don't use capitals and lower case letters, and/or that contain no or a minimum amount of punctuation marks and special characters, (such as @, #, $, etc.).

The systems, methods, devices, and techniques described herein address these and other drawbacks and provide several technical advantages over existing systems and techniques, including encouraging or requiring the use of high-entropy security information, (e.g., long, random, broad-character-set-based sets of characters for passwords, PINs, and the like), increased security from using high-entropy security information, significantly increased speed to enter a high-entropy set of characters into a target computer, and elimination or a very significant reduction in entry (e.g., typing) errors, among others.

Various implementations of the systems, methods, devices, and techniques described herein reduce or eliminate the need for a user to use a password manager or the like, or to use an unsecure document or device to record and remember their high-entropy passwords. Various implementations described herein also allow a user to quickly and accurately enter their high-entropy passwords (or the like) into a secure target computer system with virtually no entry errors, despite the password being a lengthy, difficult-to-type, unmemorable, random set of characters that is prone to typing errors when entered via a keyboard.

Various implementation of the systems, methods, devices, and techniques described herein also reduce or eliminate the need or tendency for a user to create passwords that are not random and that are not long (i.e., that have low entropy), which users tend to do for ease of usability, remembering, and entering.

In many of the examples, embodiments, and implementations described herein, a password is used as an example of a high-entropy set of characters that is used as security information. As noted previously, it should be understood that a password is just one example of one type of security information that is described herein, and the principles of the invention apply to all types of security information in addition to passwords, such as PINs, cryptographic keys, other types of keys or character strings, etc.

FIG. 1A is block diagram showing an example of a system 100 for securely producing high-entropy security information 130, consistent with embodiments of the invention. In the example shown in FIG. 1A, the system 100 includes a generator computer or generator computing system 105 that may be dedicated to (e.g., used solely for) computing, calculating, generating, verifying, or otherwise producing high-entropy sets of characters 130 that are used as security information, such as a high-entropy password 130. In various embodiments, the generator computer 105 may be a computing device containing a processor, memory, and program instructions as are known in the art, such as a laptop computer, a desktop computer, a server, a tablet computer, or the like. In various embodiments, the generator computer 105 may be configured not to have (or to have disabled) any inter-computer communication components and capabilities, such as no wireless transceiver or wireless networking capabilities (e.g., no RF/Bluetooth components) and no wired network components or capabilities (e.g., no ethernet components). In general, the system 100 may be an isolated, off-line, stand-alone system that does not communicate with other computers, devices, or systems. Thus, the generator computer 105 and the system 100 desirably cannot electronically communicate any security information 130, such as a password, to another computer, device, or system.

As shown, the generator computer 105 of the system 100 may also include one or more storage devices 110A, 110B, which may be or include an internal storage device 110A, (e.g., an internal disk drive, solid state drive, memory (e.g., RAM), or a like storage medium), and/or an external or removable storage device 110B, (e.g., an external or removable disk drive, solid state drive, thumb drive, removable hard drive, or a like storage medium). In embodiments that include the external/removable storage device 110B, it may be connected to the generator computer 105 via wired (e.g., non RF) means, such as a USB or HDMI cable, by directly plugging into a port (e.g., a USB port for a thumb drive), or the like. In various embodiments, the generator computer 105 may be configured or programmed to delete all generated security information 130 from the storage devices 110A, 110B, after printing, as described further below.

In various embodiments, the removable storage medium 110B (e.g., a removable storage medium, such as a removable solid state or hard drive) may be erasable using another computer (not shown), such that any security information (e.g., a password, the barcode representation of the password, a corresponding key check value, etc.) stored, either accidentally or intentionally, on the removable storage medium 110B is permanently and securely deletable in that manner. In some embodiments, the removable storage medium 110B may be configure to detect whether it is being tampered with, and to render any security information, (such as the high-entropy set of characters and its machine-readable representation), unrecoverable upon detecting tampering, (such as by permanently erasing the high-entropy set of characters and the machine-readable representation). In various embodiments where the application(s) or program(s) that generates the high-entropy set of characters and/or verifies the high-entropy set of characters is stored on the removable storage medium 110B, deleting or erasing the high-entropy set of characters, etc. may be performed without deleting or erasing the application(s) or program(s) itself.

In some embodiments, the storage device 110A may be a volatile storage device or medium, such as RAM, that does not retain any information when the generator computer 105 is powered down, and the storage device 110B may be a non-writable storage device or medium, such as a ROM device, that contains the application or program code that performs the operations, functions, methods, and processes described herein, such as the processes 300 and 400 described below with respect to FIGS. 3 and 4. In such embodiments, the security information and associated representations generated by the system 100 cannot be stored on the non-writable storage device 110B, and can be only temporarily stored in the volatile storage device 110A—in the worst case, stored there at longest until the generator computer 105 is turned off after use.

The system 100 may also include a display device 115, such as a touch-screen computer monitor or the like, that is connected to the generator computer 105 via wired (e.g., non RF) means, such as a USB or HDMI cable. The display device 115 may display a user interface, including prompts and questions posed by an application or program; characters and responses entered by a user; and controls for the user to enter information via the touchscreen, such as a virtual keyboard, radio buttons, and the like.

The system 100 also includes a printer 120, such as a laser printer, or an inkjet printer or the like, that is connected to the generator computer 105, for example, via wired (e.g., non RF) means, such as a USB or HDMI cable. The generator computer may interface with the printer 120, (e.g., send commands or instructions), to cause the printer 120 to print on a paper 125 various things, such as a set of characters 130, a machine-readable representation 135 of the set of characters, and the like, as shown, for example in FIGS. 1B, 6, and 7. In various embodiments, the printer 120 may be configured not to have (or to have disabled) any non-volatile memory or other internal storage device that could store information, such as password, after the printer 120 is powered down, which configuration increases secureness. In various embodiments, the printer 120 may be configured not to have (or to have disabled) any wireless communication components and capabilities, such as no wireless transceiver or wireless networking capabilities (e.g., no RF/Bluetooth components), which also increases secureness. Thus, in such embodiments, the printer 120 cannot wirelessly communicate any security information 130, such as a password, to another computer or device. In various embodiments, the generator computer 105 may be configured or programmed to delete or cause the deletion of all generated security information 130 from the printer 120, after printing.

In various embodiments the generator computer 105 may perform processes, operations, and calculations that generate or produce representations of a high-entropy set of characters 130 both in the form of a human-readable sequence or set of keyboard characters 130 and in a machine-readable form 135, such as a barcode 135, (for example, a QR code or the like). As shown in the example of FIG. 1A, the generator computer 105 may use the display device 130 to display the high-entropy set of characters 130 to a user, and the generator computer 105 may use the printer 120 to print the human-readable high-entropy set of characters 130 on a sheet of paper 125, along with a machine-readable representation 135 of the high-entropy set of characters 130. In various embodiments, the generator computer 105 may also create and cause the printer 120 to print additional information on the sheet of paper 125, as will be described in detail with respect to FIG. 1B.

Because the printer 120 prints the generated security information 130 on paper in both forms—e.g., as a string, sequence, or set of characters 130 and as a machine-readable barcode 135 or the like, the user does not need to remember or manually write down the high-entropy security information that the system 100 created. Both the printed sequence of characters and the printed barcode contain, represent, and convey the same security information 130—e.g., the same high-entropy set of characters that the system 100 generated.

Figure 2:
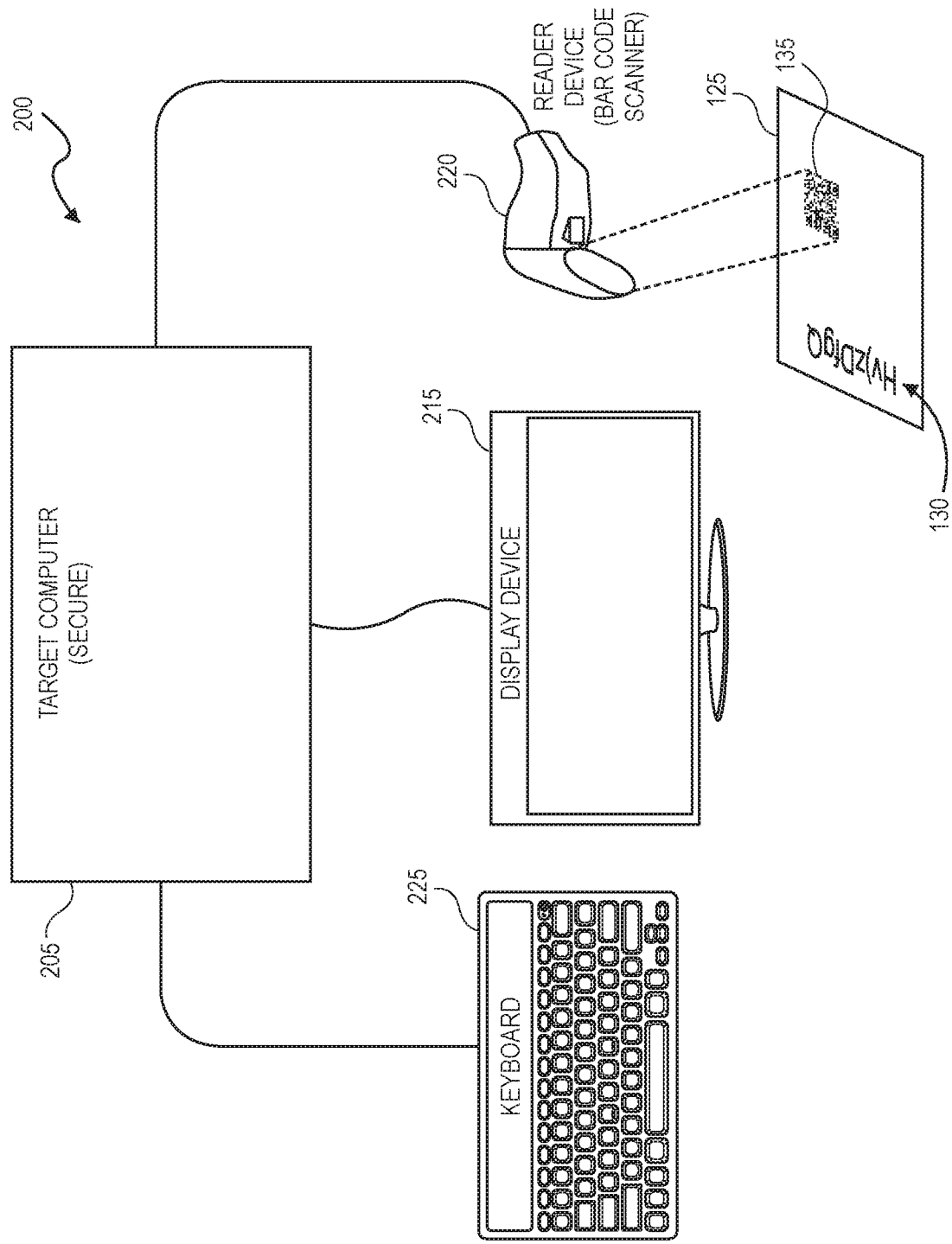
FIG. 2 is block diagram showing an example of a system for entering and using high-entropy security information, consistent with embodiments of the invention.

As described elsewhere herein in more detail, a user may read the paper form 125 while typing the human-readable high-entropy set of characters 130 into a target computer or device, and/or may enter the machine-readable representation 135 (e.g., barcode) into a target computer or device (e.g., a secure target computer 205 as shown in FIG. 2) by scanning it using an automatic reading device (e.g., a barcode scanner or reader) connected to the target computer or device.

In the example of FIG. 1A, a safe 140 or other locked enclosure may be available to hold and physically secure the printed paper 125 when the user is not using the paper 125 to enter the security information 130 into a target computer or device. In various embodiments, the only record of the generated security information 130 may be the printed paper 125. In some embodiments, the safe 140 may also be used to hold an removable storage device 110B when not in use, so that any program code, etc. stored on the removable storage device 110B is not accessible to persons who cannot open the safe 140.

As noted, in various embodiments, the generator computer 105 may be programmed or configured to securely and completely delete all generated security information 130 and the like from its storage devices 110A, 110B, from the printer 120, and/or from the display device 115. In various embodiments, the generator computer 105 may be programmed or configured not to store the security information 130 in any type of non-volatile or lasting-memory device, for example, by storing all security information 130 only in volatile memory (e.g., volatile RAM) that is automatically erased when the generator computer 105 is requested to do so during normal operation, or once powered down.

Figure 1B:
FIG. 1B is an example of a printed form that includes a high-entropy password represented in characters and in a QR code, which may be generated and used by systems consistent with embodiments of the invention.

FIG. 1B shows an example of a paper form 125 that may be printed by the printer 120 when the generator computer 105 creates or generates security-information 130, which in this example is a high-entropy password 130. As shown in FIG. 1B, the paper password form 125 shows or represents the high-entropy password as a set of 20 human-readable characters 130 "Hv)zDfgQT %}R1F3[T<zD", and also as a machine-readable QR code 135, which contains or represents the characters "Hv)zDfgQT %}R1F3[T<zD" in a barcode format.

In some embodiments, as shown in the example of FIG. 1B, the system 100 may calculate a checksum value, such as a key check value 210 (also known as a key checksum value or KCV) or the like, from or based on, the high-entropy set of characters 130, and may print the calculated KCV 210 on the paper form 125.

In various embodiments, the generator computer 105 may calculate or produce the KCV 210, or the like, by applying a cryptographically secure hash algorithm, such as the Advanced Encryption Standard Cipher Block Chaining (AES CBC) algorithm, to 16 bytes of zeroes while using the security information, which is the password 130 in this example, as the key for the hash algorithm, and then truncating the result so that only the first three bytes remain as the output value 210, where the 3 bytes may be represented as a 6-character hexadecimal string. In the example of FIG. 1B, the output of the checksum algorithm is the 6-character hexadecimal string "86a739" which is the KCV 210. As noted, other checksum algorithms, or the like, may be used to create the KCV 210 based on the set of characters 130. In embodiments that include a KCV 130, the set of characters 130 (e.g., a password 130) on the form 125 may be verified using the KCV 130, as described with respect to FIG. 4.

In some embodiments, as shown in the example of FIG. 1B, the system 100 may also represent the set of characters 130 by using or listing a phonetic or descriptive name for each character 220. The set of phonetic/descriptive names 220 aids a human user who might otherwise be confused or mistaken about characters that have a similar look when printed, such as the number one "1" and the lower case letter el "l", for example, when the user is attempting to type a set of characters 130 into a keyboard.

One of ordinary skill will recognize that the components and functions of the system 100 described in the example of FIGS. 1A and 1B may be changed or varied without departing from the scope of the scope of the present invention. For example, the system 100 may not have a storage device 110B or may have an additional storage device like device 110B. For another example, the storage device 110A may be nonvolatile, non-writeable, storage device (e.g., ROM) that stores the application or program code for performing the functions, operations, methods and/or processes described herein, and the storage device 110B may be volatile, writeable, erasable storage device (e.g., RAM) that only temporarily stores (e.g., until deleted or until device power down) the data generated and used by the application code or program code. For another example, the system 100 may not have a safe 140. For yet another example, the systems 100 may include a keyboard with which a user can enter information into the generator computer 105, in addition or alternatively to the touch-screen display device 115. Other variations are possible.

FIG. 2 is block diagram showing an example of a target system 200 for entering and using high-entropy security information 130, consistent with embodiments of the invention. In the example shown in FIG. 2, the target system 200 includes a target computer or computing device 205 that is secure in that it needs a password, a PIN, a cryptographic key or some other type of security information 130 in order to operate (e.g., to login), or for one or more of its programs or applications. For example, the secure target computer 205 may need to have a password entered into it in order for a user to log onto the secure target computer 205, and/or may need to have its password periodically changed by the user, as are known in the art.

In various embodiments, the target computer 205 may be a device such as a laptop computer, a desktop computer, a server, a tablet computer, a smartphone, or the like, which may be password protected. For example, the target computer 205 may be a password-protected secure server that contains critical, confidential, proprietary, sensitive and/or classified information.

As shown, the target system 200 may include a keyboard 225 or the like, which may be connected to the secure target computer 205 via wired (e.g., non RF) means, such as a USB or HDMI cable, and which may be is employed by a user to enter information, such as security information in the form of a set of characters 130, into the target computer 205.

The target system 200 may also include a display device 215, such as a computer monitor, a touch-screen monitor, or the like, which may be connected to the target computer 205 via wired (e.g., non RF) means, such as a USB or HDMI cable.

The target system 200 may further include a reader device 220 that can scan, read, and/or interpret the printed, machine-readable representation 135 from the paper 125 that was printed by the generator computer 105.

In various embodiments, the machine-readable representation 135 may be a printed indicia such as a barcode (e.g., a QR code), or the like, and the reader device 220 may be a barcode scanner, a digital camera, or the like. In various embodiments, the reader device 220, using, for example, its own built in decoder firmware and/or decoder software installed in the target computer 205, may scan, image, or otherwise detect the black and white elements of a machine-readable representation 135, and then interpret or convert the elements into the corresponding characters that the black and white elements represent. In the example of a barcode reader 220, the decoder may validate the barcode 134 using a check digit found in the barcode 135, recognize or detect the black and white elements of the barcode 135, and convert the black and white elements into a set of characters 130. This converted set of characters 130 may be used by the secure target computer 205, for example, as a login password, or the like.

In some embodiments, the reader device 220 (e.g., a barcode scanner) may be connected to the target computer 205 via wired (e.g., non RF) means, such as a USB or HDMI cable, while in other embodiments, a reader device 220 may be built into the target computer 205, such as a digital camera 220 that is built into a laptop computer, a tablet computer 220, a smartphone, or the like. In various embodiments, the reader device 220 that automatically reads the machine-readable representation 135 may mimic the keyboard 225 with respect to its interface with the target computer 205. In such embodiments, from the target computer 205's point of view, the output of the reader device 220 is the same or similar to that of the keyboard 225 when a user is typing in the set of characters 130 using the keyboard 225, albeit much faster and more accurate. In various embodiments, the reader device 220 may also be configured to delete any scanned representation 135, converted set of characters 130, and the like from its memory, if it stores such data.

In various embodiments, the display device 215 may display prompts, instructions, or the like directing the user to scan in (using the reader device 220) or type in (using the keyboard 225) the security information 130, 135 from the paper 125. By using the reader device 220 to automatically read the machine-readable representation 135 in order to enter the security information 130 into the secure target computer 205, the user avoids the time consuming and very-difficult-to-perform task of correctly typing in the high-entropy set of characters 130 without exceeding any time or retry limits imposed by the system 200. This is a significant improvement over the conventional keyboard technology for entering high-entropy information because it is an order of magnitude faster (e.g., less than 1 second verses 10+ seconds) and practically error-free compared to manually typing in the password, especially for users that have a reading, physical, or dexterity disability, as high-entropy character sets are by the nature of their characters difficult to manually type.

One of ordinary skill will recognize that the components and functions of the system 200 described in the example of FIG. 2 may be changed or varied without departing from the scope of the scope of the present invention. For example, the target system 200 may not have a keyboard 225, or the keyboard 225 may be disabled for the entry of security information, such that the password 130, 135 must be entered using the reader device 220.

For another example, the reader 220 may be a digital camera, and the system 200 may employ optical character recognition to automatically read the set of characters 130, instead of or in addition to employing barcode reading. Other variations are possible.

Figure 3:
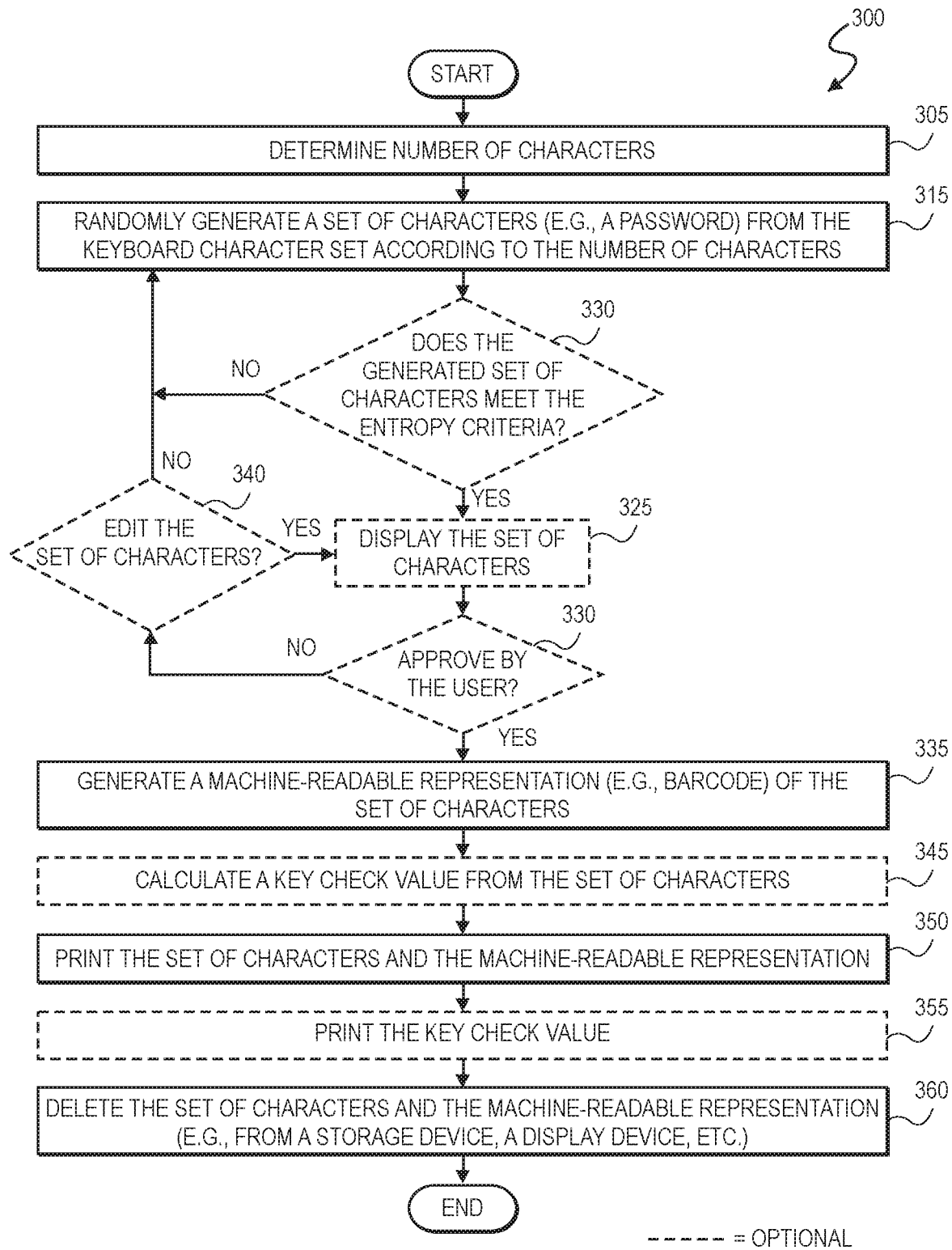
FIG. 3 is flow diagram showing an example of a process for securely producing high-entropy security information, consistent with embodiments of the invention.

FIG. 3 is flow diagram showing an example of a process 300 for securely producing or generating high-entropy security information, consistent with embodiments of the invention. In various implementations, some or all of the operations of the process 300 may be performed by the generator computer 105 or a similar computing system.

As shown in the example of FIG. 3, the process 300 begins at block 305 by determining the number of characters that will be in the set of characters 130. In some implementations the process 300 may obtain the number of characters from a user, for example by prompting the user to enter the number of characters that the user desires. In such implementations, the process may prompt and/or require the user to enter a minimum number, such as 12, or more so that the resulting set of characters will have high entropy. In other implementations, the process 300 may obtain an indication of the type of security information 130 desired, for example by prompting the user to enter or select a type, such as "password," "PIN," or "crypto key," and then determine the number of characters by setting the number to a predetermined value based on the selected type, or setting the number to a value randomly chosen from a predetermined range of values, where the range corresponds to the type selected. For example, the predetermined number of characters may be 20 for a "password" type, eight for a "PIN" type, and 64 for a "crypto key" type. Similarly, examples of the predetermined range of numbers may be 12-24 for a password and 6-9 for a PIN.

At block 315, the process 300 randomly generates a set of characters 130 from a keyboard character set (e.g., all the printable characters available on a keyboard, or a subset thereof), where the length of the set of characters is equal to the number of characters determined in block 305. In various implementations, the generator computer 105 may employ a randomization function or true random number generator (also known as a TRNG, which utilizes a high-entropy hardware-based seed value and a computer algorithm), as are known in the art, to choose a set of characters 130 from among all the possible printable characters available on a standard keyboard, such as lower case letters, uppercase letters, numbers, punctuation marks, and special characters (e.g., @, #, $, %, {, etc.).

For example, consider the use case where the process 300 determines that the number of characters is 20 based on information entered by the user indicating that the user wants to generate a password. In this use case, the generator computer 105 may generate a password by randomly select 20 characters, such as "Hv)zDfgQT %}R1F3[T<zD" (as shown in FIG. 1B), from all of the possible keyboard characters. Thus, the set of 20 characters "Hv)zDfgQT %}R1F3[T<zD" is the set of characters 130 output by block 315.

In the implementation shown in FIG. 3, at block 320, the process 300 determines whether or not the generated set of characters meets a set of criteria that characterizes a high-entropy character string. In an example where one of the criteria is not to contain a word or name, the process 300 may determine whether the generated set of characters contains any words or names by parsing the generated set of characters into subsets of characters, i.e., substrings, and comparing the substrings to a dictionary and/or to a list of names. In some such embodiments, criteria may be to not to contain a word or name that contains four or more characters, and in such embodiments the substrings may be a minimum length, such as four characters long or longer, so that the system 300 ignores three-letter words and names, two-letter words and names, and one-letter words and names.

For another example, the process 300 may determine whether the generated set of characters contains any substrings that are in the format of a date, such as "29Sep62" or "12-25-2020" or the like. For another example where one of the criteria is not to contain any common names, the process 300 may determine whether the generated set of characters contains any forwards-spelled or backwards-spelled words or names, such as "reyeM" or the like.

If the generated set of characters does not meet the set of criteria characterizing a high-entropy character string (block 320, No), for example because it contains a six-letter word, then the process 300 loops back up to block 315 to produce a new random set of characters.

In other embodiments (not shown), the process 300 may perform other actions instead of repeating block 315 in order to produce a set of characters that meets the entropy criteria. For example, the process 300 may scramble, reorder, remove, or otherwise modify only the substring(s) that do not meet the criteria (e.g., that form words or names or dates), while leaving the remaining portion(s) of the set of characters as is. Other variations are possible.

If, on the other hand, the process 300 determines that the generated set of characters meets the criteria characterizing a high-entropy character string (block 320, Yes), then the process 300 proceeds to display the set of characters (block 325). In an implementation using the system 100, the generated set of characters 130 may be displayed on the display device 115.

At block 330, the process 300 determines whether the generated set of characters is approved by the user. In some implementations, the process 300 may obtain approval from a user, for example by prompting the user to select either "approved" or "not approved" controls on a user interface shown on the display device 115.

If the generated set of characters is not approved (block 330, No), then the process 300 proceeds to block 340. At block 340, the user may either edit the displayed set of characters (block 340, Yes) (e.g., using a touch screen of the display device 115 or a keyboard (not shown in FIG. 1A)), or may direct the process 300 to proceed to block 315 (block 340, No) and generate a new random set of characters. If the user decides to edit the displayed set of characters in block 340, then the process 300 accepts input from the user, (e.g., the addition of a character(s), the deletion of a character(s), the changing of a character(s), etc.), that alters the set of characters 130. In such implementations, the generator computer 105 may provide an editor application that the user interacts with via the touch screen of the display device 115.

If, on the other hand, the generated set of characters is approved (block 330, Yes), then the process 300 proceeds to generate a machine-readable representation of the set of characters (block 325), such as a barcode, a magnetic ink pattern, or the like. For example, continuing our previous use case, the generator computer 105 may generate a matrix barcode 135, such as a QR code, that encodes or contains information representing the set of characters 130 "Hv)zDfgQT %}R1F3[T<zD".

At block 345, the process 300 calculates a key check value (KCV) from the set of characters. In some embodiments, as described above with respect to FIG. 1B, the generator computer 105 may employ an AES CBC algorithm, or the like, to produce the KCV 210 consisting of the hexadecimal number "86a739" from the set of characters 130 "Hv)zDfgQT %}R1F3[T<zD".

At block 350, the process 300 prints the set of characters and the machine-readable representation of the set of characters, for example, on a piece of paper, thin cardboard, or the like. Continuing our previous use case, the generator computer 105 may cause the printer 120 to print the set of characters 130 "Hv)zDfgQT %}R1F3[T<zD" and the matrix barcode 135 onto a piece of paper 125, as is shown in FIG. 1B.

At block 355 of the example of FIG. 3, the process 300 prints the KVC, typically on the same piece of paper as used in block 350, and as shown in the example of FIG. 1B. Although blocks 350 and 355 are described separately in the context of the implementation of FIG. 3 in order to make clear that the KCV-related operations are optional, in other implementations, the set of characters 130, the machine-readable representation 135, and the KCV 210 may all be printed together at approximately the same time. In other words, blocks 350 and 355 may be combined into a single block.

At block 360, the process 300 deletes the set of characters and the machine-readable representation, for example, from the memory and/or storage devices 110A, 110B, the display device 115, and/or any storage device (e.g., memory) of the printer 120. In various embodiments, this may include directing or instructing the printer 120 to delete the high-entropy set of characters 130 and the machine-readable representation 135 from its memory. In various embodiments, this may include stopping, erasing, or clearing the set of characters from being displayed on the display device 115 (see block 325). In various embodiments, where the storage device 110B is a removable storage device (e.g., a removable drive), this may include erasing or otherwise deleting the set of characters and the machine-readable representation from the removable storage device 110B.

In embodiments where the key check value was calculated according to block 345, block 360 may further include erasing or deleting the key check value, for example, from the memory and/or storage devices 110A, 110B, the display device 115, and/or any storage device (memory) of the printer 120. Thus, several embodiments have as an objective, among others, that the printed paper 125 is the only record of the set of characters 125, the machine-readable representation 135, etc. after the process 300 completes.

One of ordinary skill will recognize that the operations, functions, blocks, sequence, and order described in the example of FIG. 3 may be changed or varied without departing from the scope of the scope of the present invention. For example, all or some of the blocks that are outlined with dashed lines may be considered optional and may be omitted. For instance, the process 300 could be reduced to operations 305, 315, 335, 350, and 360 in some implementations.

For another example, blocks 325, 330, and 340 could be omitted in some implementations. For yet another example, block 330 could be omitted, such that the user may be the sole judge of the entropy of the generated set of characters. For yet another example, blocks 350 and 355 could be combined into a single block in some implementations.

For yet another example, a new block may be added to encrypt the set of characters, the machine-readable representation, and/or the KCV, (or in other words, securely store the generated security information representations) instead of deleting them in block 360, or block 360 may be omitted without being replaced. Other variations are possible.

Figure 4:
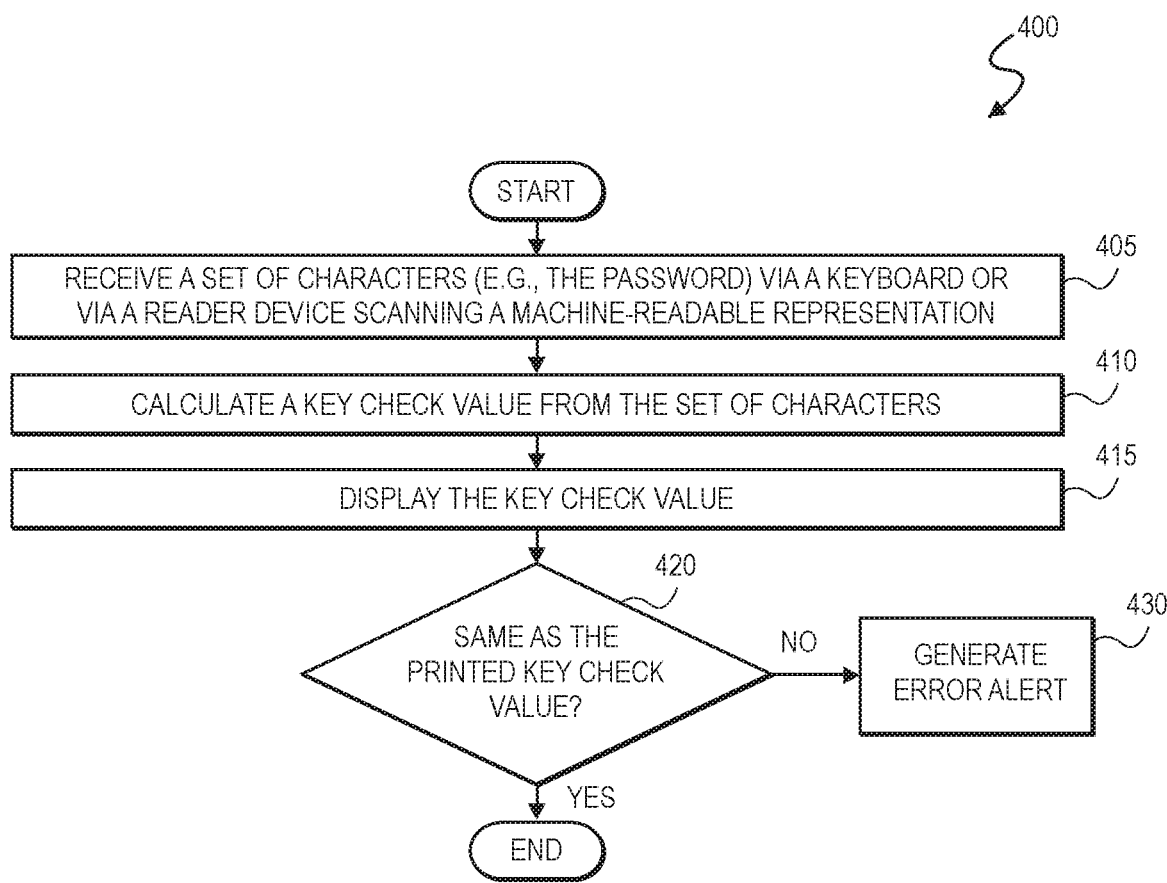
FIG. 4 is flow diagram showing an example of a process for verifying high-entropy security information, consistent with embodiments of the invention.

FIG. 4 is flow diagram showing an example of a process 400 for verifying high-entropy security information, consistent with embodiments of the invention. In various implementations, some or all of the operations and functions of the process 400 may be performed by the generator computer 105 or a similar computing system. In some such implementations, the system 100 may further include a reader device 220 and/or a keyboard 225. A user may employ the process 400 to validate or verify that the security information 130 and/or the machine-readable representation 135 on a paper form 125 have not been incorrectly calculated, forged, changed, altered, or the like. The user may desire to verify the information and representations on the paper form 125 before using them, for example, to set or change the password of a target computer 205, to set or change the PIN of a target smartphone or tablet computer, etc.

As shown in the example of FIG. 4, the process 400 begins at block 405 by receiving a set of characters, for example, the password set of characters 130 "Hv)zDfgQT %}R1F3[T<zD" as shown in the example of FIG. 1B. In some embodiments, the generator computer 105 that is implementing the process 400 may receive or obtain the set of characters 130 via the touch-screen display device 115 or a keyboard (e.g., like the keyboard 225), for example by prompting a user via the display device 115 to enter the set of characters from a password form 125 that was previously printed by the printer 120. Additionally or alternatively, in some implementations, the generator computer may receive or obtain the set of characters 130 from or via a reader device (e.g., like the reader device 220), for example by prompting a user via the display device 115 to scan the barcode 135 from a password form 125 that was previously printed by the printer 120.

At block 410, the process 400 calculates a key check value (KCV) from the set of characters that was received in block 405. In various embodiments, the generator computer 105 uses the same checksum algorithm in block 410 as was used in block 345 of FIG. 3. For example, it may employ the AES CBC algorithm to produce a KCV 210 with the value "86a739" from the password set of characters "Hv)zDfgQT %}R1F3[T<zD".

At block 415, the process 400 displays the key check value that was calculated in block 410. For example, in the implementation of system 100, the key check value 210 "86a739" may be displayed on the display device 115.

At block 420, the process 400 determines whether the calculated and displayed KCV is the same as the printed KCV 210 on the printed paper, for example the password form 125 shown in FIG. 1B.

In some implementations, this determination may be made by a user who compares the KCV that is displayed in block 415 to the printed KVC 210 that is printed on the password form 125. In such implementations, the block 420 may include additional operations to prompt the user to select an "approved" button or control on a user interface shown on the display device 115 to indicate that the displayed KCV is the same as the printed KVC 210; or conversely, to select a "not approved" button or control to indicate that they are not the same.

In some other implementations, this determination may be made by the process 400, which automatically compares the KCV that is displayed in block 415 to the printed KVC 210 that is printed on the password form 125. In some such implementations, the printed KVC 210 that is on the password form 125 may have been read and its characters subjected to optical character recognition using the reader device in block 405, and then compared to the calculated KCV from block 410. In some other such implementations, the block 420 may include operations to obtain the printed KVC 210 that is on the printed on the password form 125 from a user by prompting the user to type the printed KVC 210 into the system 100, and then comparing it to the calculated KCV from block 410.

If the calculated KCV is not the same as the printed KCV 210, (block 420, No), then the process 400 proceeds to block 430. At block 430, the process generates an error alert. Upon receiving an error alert, for example, via the display device 115, the user may discard or destroy the password form 125 before the password is put into use, (e.g., before it is used as the password on a secure target computer 205), and then use the generator computer 105 to produce a new password and corresponding password form 125, for example, as described with respect to process 300 of FIG. 3.

If, on the other hand, the calculated and displayed KCV is the same as the printed KCV 210, (block 420, Yes), then the process 400 ends without an error indication. When there is no error, the user may use the password form 125 to set or change the password, or the like, on the target computer 205 to be the high-entropy characters 130.

One of ordinary skill will recognize that the operations, functions, blocks, sequence, and order described in the example of FIG. 4 may be changed or varied without departing from the scope of the scope of the present invention. For example, block 405 may be changed to require that the set of characters be received only from a reader device 220, which interprets the machine-readable barcode 135 on the paper form 125 in order to eliminate the possibility of typographical errors by a user. Other variations are possible.

Figure 5:
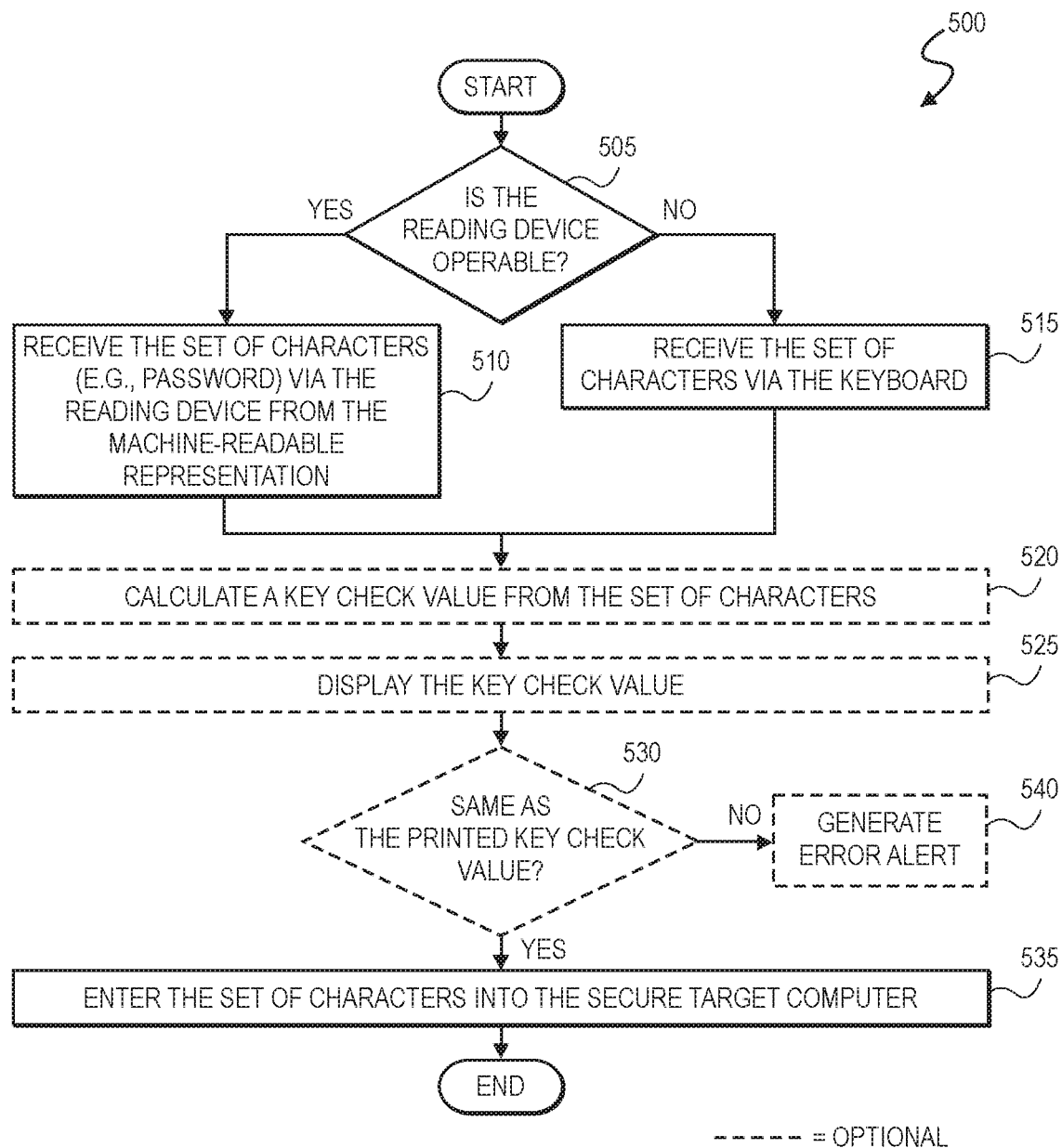
FIG. 5 is flow diagram showing an example of a process for entering and using high-entropy security information, consistent with embodiments of the invention.

FIG. 5 is flow diagram showing an example of a process 500 for entering and using high-entropy security information, consistent with embodiments of the invention. In various implementations, some or all of the operations and functions of the process 400 may be performed by the target computer 205 of the secure computing system 200 or a similar computing system or device, such as a smartphone. A user may employ the process 500 to enter the security information 130 and/or its machine-readable representation 135 from a paper form 125 into the target computer 205 in a fast and error-free manner. In some embodiments, the security information (i.e., the high-entropy set of characters 130) may be used by the operating system of the target computer 205 or by any application or program executing on the target computer 205 that requires or uses security information, such as a password, a PIN, a crypto key, or the like. For example, the user may employ the process 500 to first enter the current high-entropy password from a first password form 125 to log into the target computer 205, and then change the target computer 205's password by entering a new high-entropy password from a different password form 125 into a change-password application running on the target computer 205.

As shown in the example of FIG. 4, the process 500 begins at block 505 by determining whether the reading device 220 (e.g., a barcode reader) is operable. In the example of an implementation shown, the process 500 may require the user to employ the reading device 220 if it is operable, in order to enter the security information 130 in minimal time and to eliminate the possibility of human error when typing in the security information 130.

If the reading device 220 is operable (block 505, Yes), then the process 500 proceeds to block 510, and receives the set of characters 130, (e.g., a password 130 from the paper password form 125 shown in FIG. 1B), via the reading device 220, which interprets, reads, or converts the set of characters 130 from or based on the machine-readable representation 135 on the paper password form 125, as is known in the art.

If, on the other hand, the reading device 220 is not operable (block 505, No), then the process 500 proceeds to block 515, and receives the set of characters 130, (e.g., a password 130 as shown in FIG. 1B), via the keyboard 225. In this case, the user may read the set of characters 130 from the paper password form 125 and type the characters into the keyboard 225.

At block 520, the process 500 calculates a key check value from the set of characters 130 that was received, and at block 525 displays the key check value, for example on the display device 215. In various embodiments, the target computer 205 executes the same checksum algorithm in block 520 as was executed by the generator computer 105 to produce the KCV 210 that the generator computer 105 printed on the paper password form 125. One example is the AES CBC algorithm used to produce a KCV 210 with the value "86a739" from the password set of characters "Hv)zDfgQT %}R1F3[T<zD", as described above with respect to block 345 of FIG. 3. As noted, other checksum algorithms known in the art may be used to generate and verify a key check value.

At block 530, the process 500 determines whether the calculated KCV of block 520 is the same as the printed KCV 210, for example, as shown on the password form 125 depicted in FIG. 1B.

In some implementations, this determination may be made by a user who compares the KCV that is displayed in block 525 to the printed KVC 210 that is on the printed password form 125, in the same manner as described above with respect to block 420 of FIG. 4.

In some other implementations, the determination of block 530 may be made by the process 500 (e.g., as performed by the target computer 205), which automatically compares the KCV that is displayed in block 525 to the printed KVC 210 that is printed on the password form 125, in the same manner as described above with respect to block 420 of FIG. 4.

If the calculated KCV from block 520 is not the same as the printed KCV 210, (block 530, No), then the process 500 proceeds to block 540. At block 540, the process 500 generates an error alert. Upon receiving an error alert, for example, via the display device 215, the user may cease or abort or retry (e.g., by redoing blocks 510 or 515) entering the security information (e.g., the password set of characters 130) into the target computer 205, as the KVC error alert may signify that the set of characters 130 and/or the machine-readable representation 135 on the paper form 125 have been altered, misread, entered incorrectly, or the like.

If, on the other hand, the calculated and displayed KCV is the same as the printed KCV 210, (block 5300, Yes), then the process 500 proceeds to block 535. At block 535, the high-entropy set of characters 130 (e.g., the password) received in block 510 or 515 is entered in the target computer 205 (e.g., into a program or application), and the process 500 ends. In some embodiments, the process 500 may prompt the user via the display device 215 for permission before entering the set of characters 130 into the target computer 205.

One of ordinary skill will recognize that the operations, functions, blocks, sequence, and order described in the example of FIG. 5 may be changed or varied without departing from the scope of the scope of the present invention. For example, all or some of the blocks that are outlined with dashed lines may be considered optional and may be omitted. For instance, the process 500 could be reduced to operations 505, 510, 515, and 535 in some implementations. For another example, block 505 may be changed to allow the user to employ the keyboard 225 to enter the security information 130, if the user so desires, even when the reading device 220 is operable. Other variations are possible.

Figure 6:
FIG. 6 is an example of a printed form that includes a high-entropy personal identification number (PIN) represented in characters and in a QR code, which may be generated and used by systems consistent with embodiments of the invention.

FIG. 6 is another example of a paper 125, here a Personal Identification Number (PIN) form, which may be printed by the printer 120 when the generator computer 105 creates or generates a high-entropy PIN 130 for a user. As shown in FIG. 6, the PIN form 125 in this example represents the PIN as a set of eight human-readable characters "dZ0b4fr~g" 130 and as a QR code 135. The PIN form 125 also includes a KCV 210 this is calculated based on the PIN set of characters 130.

FIG. 7 is yet another example of a paper form 125, here a key component form, which may be printed by the printer 120 when the system 100 creates or produces a high-entropy key 130 for a user. As shown in FIG. 7, the key component form 125 represents the key as a set of 64 human-readable characters 130 and as a QR code 135, and includes a corresponding KCV 210. In the example of FIG. 7, the high-entropy security information 130 is a cryptographic key. For the case of usage as a cryptographic key, the set of characters 130 may be restricted to being drawn only from the group of hexadecimal symbols (0, 1, 2, 3, 4, 5, 6, 7, 8, 9, a, b, c, d, e, f). Other use cases and implementation may similarly require that the set of characters 130 be drawn (e.g., randomly selected) from a specified group of characters. In such implementations, the process 300 of FIG. 3 may be modified such that block 315 randomly generates a set of characters 130 from the set of hexadecimal symbols (instead of from the keyboard character set).

In various embodiments described herein, because the security information, (e.g., PIN, password, key, etc.), is represented in a machine-readable format 135 that is automatically entered into the target computer 205, the generator system 100 can be configured to produce long, random, and extremely secure sets of characters for passwords and the like that include 20 characters or more, such as 25 characters, 30 characters, or 64 characters without the drawbacks associated with conventional systems. The high entropy nature of these sets of characters will not hinder usage by a person because the person does not have to remember or manually type in the characters.

Various aspects of the present disclosure can be summarized as follows:

Aspect 1. A system for securely producing high-entropy security information, the system comprising:
printing means;
display means; and
computing means operably connected to the printing means and the display means, the computing means comprising:
processing means; and
storage means operably connected to the processing means and containing instructions;
wherein the processing means is configured to execute the instructions to perform operations comprising:
generating a high-entropy set of characters;
generating a machine-readable representation that represents the high-entropy set of characters;
providing the high-entropy set of characters and the machine-readable representation to the printing means for printing on paper; and
deleting the high-entropy set of characters and the machine-readable representation.

Aspect 2. The system of aspect 1, wherein the printing means lacks storage means.

Aspect 3. The system of any of aspects 1-2, wherein deleting the high-entropy set of characters and the machine-readable representation comprises:
directing the printing means to delete the high-entropy set of characters and the machine-readable representation after the printing.

Aspect 4. The system of any of aspects 1-3, wherein:
the storage means comprises a removable storage medium;
generating the high-entropy set of characters comprises storing the high-entropy set of characters on the removable storage medium; and
generating the machine-readable representation comprises storing the machine-readable representation on the removable storage medium.

Aspect 5. The system of aspect 4, wherein deleting the high-entropy set of characters and the machine-readable representation further comprises:
erasing the high-entropy set of characters and the machine-readable representation from the removable storage medium.

Aspect 6. The system of aspect 4, wherein the removable storage medium is configure to render the high-entropy set of characters and the machine-readable representation unrecoverable upon detecting tampering with the removable storage medium.

Aspect 7. The system of any of aspects 1-6, wherein the operations further comprise:
determining a number of characters for the high-entropy security information; and
wherein generating the high-entropy set of characters comprises:
generating the high-entropy set of characters according to the number of characters.

Aspect 8. The system of any of aspects 1-7, wherein the operations further comprise:
displaying the high-entropy set of characters on the display means; and
enabling a user to edit the high-entropy set of characters using the display means.

Aspect 9. The system of any of aspects 1-8, wherein deleting the high-entropy set of characters and the machine-readable representation comprises:
clearing the high-entropy set of characters from the display means.

Aspect 10. The system of any of aspects 1-9, wherein the high-entropy set of characters is input into a target computer using the machine-readable representation that was printed.

Aspect 11. The system of any of aspects 1-10, wherein the high-entropy set of characters is at least one of: a password, a personal identification number (PIN), or a key that is used in cryptography.

Aspect 12. The system of any of aspects 1-11, wherein the machine-readable representation is a barcode.

Aspect 13. The system of any of aspects 1-11, wherein the machine-readable representation is a quick response (QR) code.

Aspect 14. The system of any of aspects 1-13, further comprising:
a target system comprising:
target computing means; and
reader means operably connected to the target computing means and that reads the machine-readable representation from the paper and provides the high-entropy set of characters that is represented by the machine-readable representation to the target computing means.

Aspect 15. The system of aspect 14, wherein the reader means is a barcode scanner and the machine-readable representation is a barcode.

Aspect 16. The system of aspect 14, wherein the reader means is a digital camera and the machine-readable representation is a barcode.

Aspect 17. The system of any of aspects 1-16, wherein the operations further comprise:
calculating a key check value (KCV) from the high-entropy set of characters; and
providing the key check value to the printing means for printing on the paper.

Aspect 18. A system for producing high-entropy security information, the system comprising:
a printer;
a display device; and
a generator computer that is operably connected to the printer and the display device, the generator computer comprising:
a processor; and
a storage device that is operably connected to the processor and that contains instructions;
wherein the processor executes the instructions to perform operations comprising:
generating a high-entropy set of characters;
displaying the high-entropy set of characters on the display device;
accepting input from a user to edit the high-entropy set of characters;
generating a machine-readable representation that represents the high-entropy set of characters;
calculating a key check value from the entropy set of characters;
causing the printer to print the high-entropy set of characters, the machine-readable representation, and the key check value on a paper; and
deleting the high-entropy set of characters and the machine-readable representation.

Aspect 19. The system of aspect 18, wherein the operations further comprise:
deleting the key check value.

Aspect 20. The system of any of aspects 18-19, wherein deleting the high-entropy set of characters further comprises erasing the high-entropy set of characters from the display device.

Aspect 21. The system of any of aspects 18-20, wherein the operations further comprise:
determining a number of characters for the high-entropy security information; and
wherein generating the high-entropy set of characters comprises:
generating the high-entropy set of characters according to the number of characters.

Aspect 22. The system of any of aspects 18-21, wherein the storage device comprises a removable storage device, and wherein deleting the high-entropy set of characters and the machine-readable representation comprises deleting the high-entropy set of characters and the machine-readable representation from the removable storage device.

Aspect 23. The system of any of aspects 18-22, wherein the high-entropy set of characters is input into a target computer using the machine-readable representation printed on the paper.

Aspect 24. The system of any of aspects 18-23, wherein the machine-readable representation is a barcode.

Aspect 25. The system of any of aspects 18-24, wherein generating a high-entropy set of characters comprises randomly selecting a set of characters from a keyboard character set.

Aspect 26. The system of any of aspects 18-25, wherein generating a high-entropy set of characters comprises determining that the high-entropy set of characters does not contain one or more of: a word, a name, and a date.

Aspect 27. The system of any of aspects 18-26, wherein the high-entropy set of characters is input into a target computer using the machine-readable representation that was printed.

Aspect 28. The system of any of aspects 18-27, further comprising:
a target system comprising:
a target computer; and
a reader device that is operably connected to the target computer and that reads the machine-readable representation from the paper and provides the high-entropy set of characters that is represented by the machine-readable representation to the target computer.

Aspect 29. The system of aspect 28, wherein the reader device is a barcode scanner and the machine-readable representation is a barcode.

Aspect 30. The system of aspect 28, wherein the reader device is a digital camera and the machine-readable representation is a barcode.

Aspect 31. A method for securely producing high-entropy security information, the method comprising: generating a high-entropy set of characters, generating a machine-readable representation that represents the high-entropy set of characters, providing the high-entropy set of characters and the machine-readable representation to a printer for printing on paper, and deleting the high-entropy set of characters and the machine-readable representation.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Other embodiments of the invention will be apparent to those skilled in the art from consideration of the specification and practice of the invention disclosed herein. It is intended that this specification and the descriptions herein be considered as examples only, with a true scope and spirit of the invention being indicated by the claims.

What is claimed is:

1. A system for producing high-entropy security information, the system comprising:
    a printer;
    a display device; and
    a generator computer that is operably connected to the printer and the display device, the generator computer comprising:
        a processor; and
        a storage device that is operably connected to the processor and that contains instructions;
        wherein the processor executes the instructions to perform operations comprising:
            generating a high-entropy set of characters;
            displaying the high-entropy set of characters on the display device;
            accepting input from a user to edit the high-entropy set of characters;
            generating a machine-readable representation that represents the high-entropy set of characters;
            calculating a key check value from the high-entropy set of characters;
            causing the printer to print the high-entropy set of characters, the machine-readable representation, and the key check value on a paper; and
            deleting the high-entropy set of characters and the machine-readable representation.

2. The system of claim 1, wherein the operations further comprise:
    deleting the key check value.

3. The system of claim 1, wherein deleting the high-entropy set of characters further comprises erasing the high-entropy set of characters from the display device.

4. The system of claim 1, wherein the operations further comprise:
    determining a number of characters for the high-entropy security information; and
    wherein generating the high-entropy set of characters comprises:
    generating the high-entropy set of characters according to the number of characters.

5. The system of claim 1, wherein the storage device comprises a removable storage device, and wherein deleting the high-entropy set of characters and the machine-readable representation comprises deleting the high-entropy set of characters and the machine-readable representation from the removable storage device.

6. The system of claim 1, wherein the high-entropy set of characters is input into a target computer using the machine-readable representation printed on the paper.

7. The system of claim 1, wherein the machine-readable representation is a barcode.

8. The system of claim 1, wherein generating a high-entropy set of characters comprises randomly selecting a set of characters from a keyboard character set.

9. The system of claim 1, wherein generating a high-entropy set of characters comprises determining that the high-entropy set of characters does not contain one or more of: a word, a name, and a date.

10. The system of claim 1, wherein generating a high-entropy set of characters comprises randomly selecting a set of characters from a group of hexadecimal symbols.

11. The system of claim 1, further comprising:
    a target system comprising:
    a target computer; and
    a reader device that is operably connected to the target computer and that reads the machine-readable representation from the paper and provides the high-entropy set of characters that is represented by the machine-readable representation to the target computer.

12. The system of claim 11, wherein the reader device is a barcode scanner, and the machine-readable representation is a barcode.

13. The system of claim 11, wherein the reader device is a digital camera, and the machine-readable representation is a barcode.

14. A computer for generating high-entropy security information, the computer comprising:
    a processor; and
    a storage device that is operably connected to the processor and that contains instructions;
    wherein the processor executes the instructions to perform operations comprising:
        generating a high-entropy set of characters;
        displaying the high-entropy set of characters;
        accepting input from a user to edit the high-entropy set of characters;
        generating a machine-readable representation that represents the high-entropy set of characters;
        calculating a key check value from the high-entropy set of characters;
        printing the high-entropy set of characters, the machine-readable representation, and the key check value on a paper; and
        deleting the high-entropy set of characters and the machine-readable representation.

15. The computer of claim 14, wherein displaying the high-entropy set of characters comprises causing a display device to display the high-entropy set of characters.

16. The computer of claim 14, wherein printing the high-entropy set of characters, the machine-readable representation, and the key check value comprises causing a printer to print the high-entropy set of characters, the machine-readable representation, and the key check value.

17. The computer of claim 14, wherein the operations further comprise:
    deleting the key check value.

18. The computer of claim 14, wherein deleting the high-entropy set of characters further comprises ceasing to display the high-entropy set of characters.

19. The computer of claim 14, wherein the operations further comprise:
    determining a number of characters for the high-entropy security information; and
    wherein generating the high-entropy set of characters comprises:
    generating the high-entropy set of characters according to the number of characters.

20. The computer of claim 14, wherein the storage device comprises a removable storage device, and wherein deleting the high-entropy set of characters and the machine-readable representation comprises deleting the high-entropy set of characters and the machine-readable representation from the removable storage device.

21. The computer of claim 14, wherein the high-entropy set of characters is input into a target computer using the machine-readable representation printed on the paper.

22. The computer of claim 21, wherein a reader device that is operably connected to the target computer reads the machine-readable representation from the paper.

23. The computer of claim 14, wherein the machine-readable representation is a barcode.

24. The computer of claim 14, wherein generating a high-entropy set of characters comprises randomly selecting a set of characters from a keyboard character set.

25. The computer of claim 14, wherein generating a high-entropy set of characters comprises determining that the high-entropy set of characters does not contain one or more of: a word, a name, and a date.

26. The computer of claim 14, wherein generating a high-entropy set of characters comprises randomly selecting a set of characters from a group of hexadecimal symbols.

27. A computer for generating high-entropy security information, the computer comprising:
 a processor; and
 a storage device that is operably connected to the processor and that contains instructions;
 wherein the processor executes the instructions to perform operations comprising:
  generating a high-entropy set of characters;
  displaying the high-entropy set of characters;
  changing the high-entropy set of characters;
  generating a machine-readable representation that represents the high-entropy set of characters;
  calculating a key check value from the high-entropy set of characters;
  printing the high-entropy set of characters, the machine-readable representation, and the key check value on a paper; and
  deleting the high-entropy set of characters and the machine-readable representation.

28. The computer of claim 27, wherein changing the high-entropy set of characters comprises editing the high-entropy set of characters based on input from a user.

29. A non-transitory computer readable medium including instructions that, when executed by a processor, cause the process to perform operations comprising:
 generating a high-entropy set of characters;
 displaying the high-entropy set of characters;
 changing the high-entropy set of characters;
 generating a machine-readable representation that represents the high-entropy set of characters;
 calculating a key check value from the high-entropy set of characters;
 printing the high-entropy set of characters, the machine-readable representation, and the key check value on a paper; and
 deleting the high-entropy set of characters and the machine-readable representation.

30. The non-transitory computer readable medium of claim 29, wherein the operations further comprise:
 determining a number of characters for the high-entropy set of characters; and
 wherein generating the high-entropy set of characters comprises:
 generating the high-entropy set of characters according to the number of characters.

* * * * *